United States Patent
Hsiang (10) Patent No.: US 11,019,338 B2
(45) Date of Patent: May 25, 2021

(54) METHODS AND APPARATUSES OF VIDEO ENCODING OR DECODING WITH ADAPTIVE QUANTIZATION OF VIDEO DATA

(71) Applicant: MEDIATEK INC., Hsinchu (TW)

(72) Inventor: Shih-Ta Hsiang, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/966,265

(22) PCT Filed: Dec. 12, 2018

(86) PCT No.: PCT/CN2018/120629
§ 371 (c)(1),
(2) Date: Jul. 30, 2020

(87) PCT Pub. No.: WO2019/148977
PCT Pub. Date: Aug. 8, 2019

(65) Prior Publication Data
US 2020/0404275 A1 Dec. 24, 2020

Related U.S. Application Data

(60) Provisional application No. 62/624,865, filed on Feb. 1, 2018, provisional application No. 62/624,869, filed on Feb. 1, 2018.

(51) Int. Cl.
*H04N 19/154* (2014.01)
*H04N 19/186* (2014.01)
(Continued)

(52) U.S. Cl.
CPC ......... *H04N 19/124* (2014.11); *H04N 19/159* (2014.11); *H04N 19/186* (2014.11); *H04N 19/30* (2014.11); *H04N 19/60* (2014.11)

(58) Field of Classification Search
CPC .. H04N 19/124; H04N 19/159; H04N 19/186; H04N 19/30; H04N 19/60
(Continued)

(56) References Cited

U.S. PATENT DOCUMENTS 8,942,289 B2   1/2015   Srinivasan et al.
9,451,258 B2   9/2016   Van Der Auwera et al.
(Continued)

FOREIGN PATENT DOCUMENTS

CN   101617539 A   12/2009
CN   104205836 A   12/2014
(Continued)

OTHER PUBLICATIONS

International Search Report and Written Opinion dated Mar. 6, 2019, issued in application No. PCT/CN2018/120629.
(Continued)

*Primary Examiner* — Jae N Noh
(74) *Attorney, Agent, or Firm* — McClure, Qualey & Rodack, LLP (57) ABSTRACT

Video encoding or decoding methods and apparatuses for processing video data with color components comprise receiving video data, performing inter prediction and intra prediction, determining a luma Quantization Parameter (QP), deriving a chroma QP bias, calculating a chroma QP from the chroma QP bias and the luma QP, performing transform or inverse transform, and performing quantization or inverse quantization for the luma component utilizing the luma QP and for the chroma component utilizing the chroma QP. The chroma QP bias is derived from an intermediate QP index, and the intermediate QP index is computed by clipping a sum of the luma QP and a chroma QP offset parameter to a specified range. The bits allocated to code the luma and
(Continued)

chroma components may be adaptively controlled by restricting the chroma QP bias.

18 Claims, 5 Drawing Sheets

(51) Int. Cl.
    *H04N 19/124*     (2014.01)
    *H04N 19/159*     (2014.01)
    *H04N 19/30*     (2014.01)
    *H04N 19/60*     (2014.01)

(58) Field of Classification Search
    USPC .................................................. 375/240.02
    See application file for complete search history.

(56) References Cited

U.S. PATENT DOCUMENTS

| | | |
|---|---|---|
| 9,883,184 B2 | 1/2018 | Rapaka et al. |
| 9,948,933 B2 | 4/2018 | Zhang et al. |
| 2003/0112863 A1* | 6/2003 | Demos ................. H04N 19/124 375/240.01 |
| 2008/0317377 A1* | 12/2008 | Saigo .................... H04N 19/136 382/274 |
| 2010/0086025 A1 | 4/2010 | Chen et al. |
| 2017/0318293 A1 | 11/2017 | Chono |
| 2018/0376143 A1* | 12/2018 | Andersson ........... H04N 19/196 |

FOREIGN PATENT DOCUMENTS

| | | |
|---|---|---|
| CN | 106105205 A | 11/2016 |
| CN | 107079150 A | 8/2017 |
| CN | 107113431 A | 8/2017 |
| EP | 2 698 991 A2 | 2/2014 |
| WO | 2012/167713 A1 | 12/2012 |

OTHER PUBLICATIONS

Chinese language office action dated Dec. 9, 2019, issued in application No. TW 108103914.

* cited by examiner

Fig. 1

MxM  M/2xM  MxM/2  M/2xM/2

M/4xM (L)  M/4xM (R)  MxM/4 (U)  MxM/4 (D)

METHODS AND APPARATUSES OF VIDEO ENCODING OR DECODING WITH ADAPTIVE QUANTIZATION OF VIDEO DATA

CROSS REFERENCE TO RELATED APPLICATIONS

The present invention claims priority to U.S. Provisional Patent Application Ser. No. 62/624,869, filed on Feb. 1, 2018, entitled "Methods and apparatus for adaptive quantization of video data", U.S. Provisional Patent Application Ser. No. 62/624,865, filed on Feb. 1, 2018, entitled "Methods and apparatus for quantization of video data". The U.S. Provisional patent applications are hereby incorporated by reference in their entireties.

FIELD OF THE INVENTION

The present invention relates to video encoding or decoding methods and apparatuses with adaptive quantization of video data. In particular, the present invention relates to video data processing methods and apparatuses encode or decode video data with adaptive chrominance quantization parameters derived from associated luminance quantization parameters.

BACKGROUND AND RELATED ART

Figure 1:
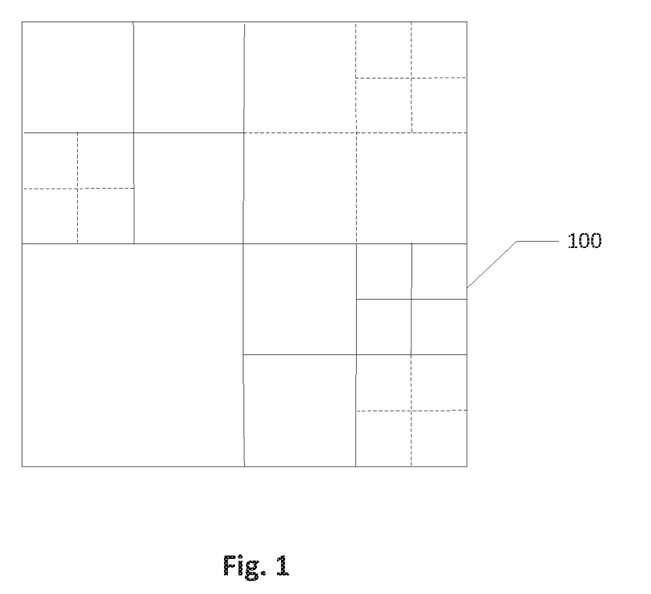
FIG. 1 illustrates an exemplary coding tree for splitting a Coding Tree Unit (CTU) into Coding Units (CUs) and splitting each CU into one or more Transform Units (TUs) in the HEVC standard.

The High-Efficiency Video Coding (HEVC) standard is the latest video coding standard developed by the Joint Collaborative Team on Video Coding (JCT-VC) group of video coding experts from ITU-T Study Group. The HEVC standard relies on a block-based coding structure which divides each slice of video data into non-overlapped square blocks called Coding Tree Units (CTUs). A video picture is represented by a collection of slices, and each slice is composed of an integer number of CTUs. A raster scan order is used to process the CTUs in a slice. Each CTU is further recursively divided into one or more Coding Units (CUs) using recursive quadtree partitioning structure to adapt to various local motion and texture characteristic. The CU size is restricted to be less than or equal to a minimum allowed CU size, which is specified in a Sequence Parameter Set (SPS). An example of the quadtree block partitioning structure is illustrated in FIG. 1, where the solid lines indicate CU boundaries in CTU 100. The prediction decision is made at the CU level, where each CU is coded using either Inter prediction or Intra prediction. Sample values of each CU in a Bi-predictive (B) slice may be predicted using intra prediction according to an intra mode or inter prediction with at most two motion vectors and reference indices. Sample values of each CU in a Predictive (P) slice may be predicted using intra prediction according to an intra mode or inter prediction with only one motion vector and one reference index. All CUs in an Intra (I) slice are predicted using intra prediction.

Figure 2:
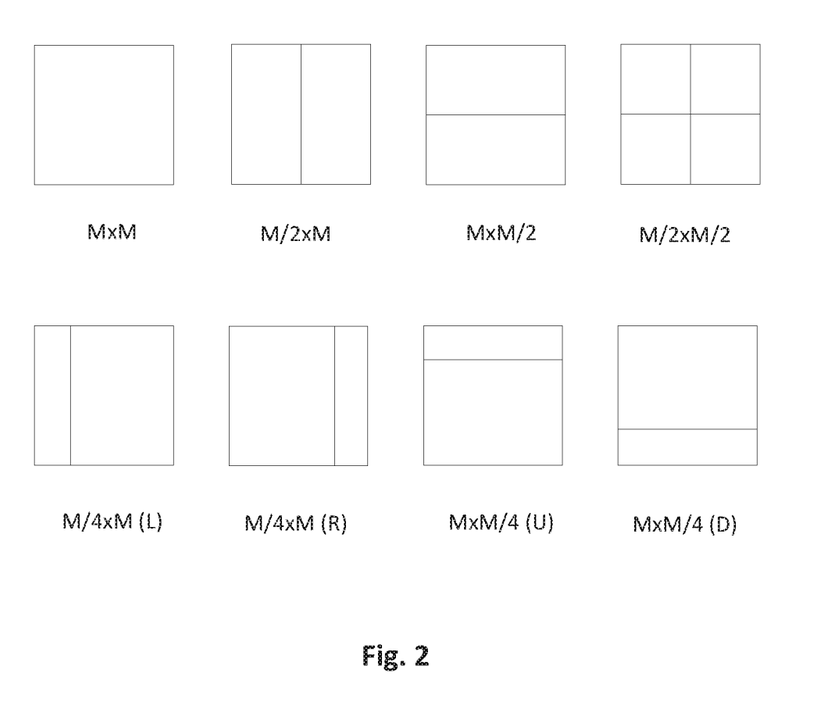
FIG. 2 illustrates eight different PU partition types splitting a CU into one or more PUs according to the HEVC standard.

Once the splitting of CU hierarchical tree is done, each CU is subject to further split into one or more Prediction Units (PUs) according to a PU partition type for prediction. FIG. 2 shows eight PU partition types defined in the HEVC standard. Each CU is split into one, two, or four PUs according to one of the eight PU partition types shown in FIG. 2. The PU works as a basic representative block for sharing the prediction information as the same prediction process is applied to all pixels in the PU. The prediction information is conveyed to the decoder on a PU basis. After obtaining a residual signal generated by the prediction process, residual data of the residual signal belong to a CU is split into one or more Transform Units (TUs) according to a Residual QuadTree (RQT) block partitioning structure for representing the associated prediction residual signal. Residual in a TU will be transformed into transform coefficients for compact data representation. The dotted lines in FIG. 1 indicate TU boundaries of CTU 100. The TU is a basic representative block for applying transform and quantization on the residual signal. For each TU, a transform matrix having the same size as the TU is applied to the residual signal to generate the transform coefficients, and these transform coefficients are quantized and conveyed to the decoder on a TU basis. A TU is composed of a transform block (TB) of luminance (luma) samples of size 8×8, 16×16, or 32×32 or four TBs of luma samples of size 4×4, and two corresponding TBs of chrominance (chroma) samples in a picture in 4:2:0 color format. An integer transform processing followed by a quantization processing is applied to each TB, and quantized coefficient levels are encoded in the video bitstream.

The terms Coding Tree Block (CTB), Coding block (CB), Prediction Block (PB), and TB are defined to specify two dimensional sample array of one color component associated with the CTU, CU, PU, and TU respectively. For example, a CTU consists of one luma CTB, two chroma CTBs, and its associated syntax elements. In the HEVC system, the same quadtree block partitioning structure is generally applied to both luma and chroma components unless a minimum size for chroma block is reached.

Joint Video Exploration Team (JVET) of ITU-T SG 16 WP 3 and ISO/IEC JTC 1/SC 29/WG 11 is currently developing the next-generation video coding standard Versatile Video Coding (VVC). Some promising new coding tools have been adopted into the Joint Exploration Model (JEM) for further investigation such as a QuadTree plus Binary Tree (QTBT) structure is utilized for partitioning a CTU into one or multiple CUs. QTBT structure combines a quadtree partitioning method with a binary-tree partitioning method, which balances the coding efficiency and the coding complexity of the two partitioning methods. Each CU partitioned using the QTBT structure is employed as the basic representation unit for prediction and transform processing without further partitioning, that is one CU contains exactly one PU for prediction and one CU contains exactly one TU for transform and quantization. The dimension of each resulting TB ranges from 128×128 to 2×2, and each TB is either a square or a rectangular shape. The quantization method specified in the HEVC standard is reused in JEM for quantization of the transform coefficients in each TB.

In the HEVC standard and JEM, a quantization parameter (QP) is decided at the encoder side to control the coarseness of the quantization of transform coefficients in each TB, and QP information is conveyed to the decoder side so that the decoder will use the same QP for proper decoding process. In general, for a lower QP value, the quality of the encoded video is higher, but more bits are consumed. On the other hand, for a higher QP value, the quality of the encoded video is lower and fewer bits are consumed. A delta QP derived by the difference between a current coding QP and a reference QP is transmitted instead of the current coding QP in order to reduce the bits required for QP information signaling. An encoder may set different values of QP for a luma component and chroma components. In this way, the encoder can control how quantization is performed for different color components, and thereby regulate the quality and bitrate between the color components.

BRIEF SUMMARY OF THE INVENTION

Methods and apparatuses of encoding or decoding video data in a video coding system are disclosed. Embodiments of the video encoding or decoding method receive video data having a luma component and at least one chroma component, perform inter prediction and/or intra prediction on the received video data to reduce temporal and/or spatial redundancies within the received video data, determine a luma QP for the luma component, deriving a chroma QP bias from an intermediate QP index (qPi), and calculating a chroma QP by subtracting the chroma QP bias from the luma QP or by subtracting the chroma QP bias from the intermediate QP index. The intermediate QP index is derived from the luma QP, for example, by clipping a sum of the luma QP and a chroma QP offset parameter to a specified range. Information associated with the chroma QP offset parameter and the specified range may be explicitly signaled in a video bitstream. The video encoding or decoding method then performs a transform processing during encoding of the received video data and/or performs an inverse transform processing during reconstruction of encoding or decoding of the received video data, and performs a quantization processing during encoding of the received video data and/or performs an inverse quantization processing during reconstruction of encoding or decoding of the received video data for the luma component utilizing the luma QP and for the chroma component utilizing the chroma QP.

For video data having two chroma components, including chroma Cb and chroma Cr components, embodiments of the video encoding or decoding method derives one chroma QP bias for the chroma Cb component and another chroma QP bias for the chroma Cr component. Information for deriving these chroma QP biases is signaled in one or more of a Picture Parameter Set (PPS), slice header, and each coding unit for the chroma Cb and chroma Cr components.

An embodiment of the chroma QP bias is derived by a function $F_{gpBs}$ (qPi) and a parameter set, where the function $F_{gpBs}$ (qPi) outputs an integral value according to qPi, and the integral value is scaled according to the parameter set. The chroma QP bias is equal to the scaled integral value. Each value in the parameter set may be implicitly predefiend or explicitly derived from information signaled in a video bitstream. In one example, the parameter set includes two QP boundary values qpBs1, qpBs2, an upper index range t1, a lower index range t2, and one or more scaling parameters. A value of the chroma QP bias is restricted by qpBs1 and qpBs2, and the chroma QP bias is equal to the scaled integral value when qPi is within the index range defined by t1 and t2, and the chroma QP bias is equal to one of qpBs1 and qpBs2 when qPi is outside the index range.

In one embodiment, the chroma QP bias is derived from a difference between qPi and the output of a specified function Fqpc (qPi), and the chroma QP is derived by subtracting the chroma QP bias from the qPi. In a variation of an embodiment, the chroma QP bias is derived from a difference between the luma QP and the output of the specified function Fqpc (qPi), and the chroma QP is derived by subtracting the chroma QP bias from the luma QP. An example of the function Fqpc (qPi) outputs a value by searching a mapping table according to qPi.

Some embodiments of deriving the chroma QP bias further restrict the chroma QP bias by a maximum chroma QP bias value. The chroma QP bias is clipped to the maximum chroma QP bias value if the chroma QP bias is greater than the maximum chroma QP bias value. The maximum chroma QP bias value is explicitly signaled in a high-level syntax set according to some embodiments, and the maximum chroma QP bias value may be further signaled in coding units or in units of quantization groups according to a specific embodiment. In an embodiment, the chroma QP bias is also restricted by a minimum chroma QP bias value, and it is clipped to the minimum chroma QP bias value if the chroma QP bias is smaller than the minimum chroma QP bias value. The minimum chroma QP bias value is explicitly signaled or implicitly inferred. For example, the minimum chroma QP bias value is set to zero whereas the maximum chroma QP bias value is adaptive derived. An encoder may signal the maximum chroma QP bias value in a video bitstream and a decoder may derive the maximum chroma QP bias value from the video bitstream. One embodiment of restricting the chroma QP bias by the maximum chroma QP bias value is by selecting a minimum value between the maximum chroma QP bias value and the chroma QP bias. The chroma QP is then derived by subtracting the minimum value between the maximum chroma QP bias value and the chroma QP bias from the luma QP or the intermediate QP index.

In some embodiment of deriving the chroma QP bias, the chroma QP bias is scaled and the scaled chroma QP bias is subtracted from the luma QP or the intermediate QP index to determine the chroma QP. A scaling factor or a parameter set of integral parameters may be signaled in a video bitstream for scaling the chroma QP bias.

Aspects of the disclosure further provide an apparatus for performing video coding which comprises a computer processor configured to receive video data and perform encoding or decoding. Embodiments of the apparatus receive video data with luma and chroma components, perform prediction to reduce redundancies within the received video data, perform a transform processing and/or inverse transform processing, and perform a quantization processing and/or inverse quantization processing. A chroma QP is adaptively derived from an associated luma QP according to a chroma QP bias. The chroma QP bias is derived from an intermediate QP index, and the chroma QP is calculated by subtracting the chroma QP bias from the luma QP or by subtracting the chroma QP bias from the intermediate QP index. The luma QP is utilized for quantization and inverse quantization for the luma component and the chroma QP is utilized for quantization and inverse quantization for the chroma component.

Aspects of the disclosure further provide a non-transitory computer readable medium storing program instructions for causing a processing circuit of an apparatus to perform video coding process with adaptive chroma QP derived by an associated luma QP and a chroma QP bias. Other aspects and features of the invention will become apparent to those with ordinary skill in the art upon review of the following descriptions of specific embodiments.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF THE INVENTION

It will be readily understood that the components of the present invention, as generally described and illustrated in the figures herein, may be arranged and designed in a wide variety of different configurations. Thus, the following more detailed description of the embodiments of the systems and methods of the present invention, as represented in the figures, is not intended to limit the scope of the invention, as claimed, but is merely representative of selected embodiments of the invention. Reference throughout this specification to "an embodiment", "some embodiments", or similar language means that a particular feature, structure, or characteristic described in connection with the embodiments may be included in at least one embodiment of the present invention. Thus, appearances of the phrases "in an embodiment" or "in some embodiments" in various places throughout this specification are not necessarily all referring to the same embodiment, these embodiments can be implemented individually or in conjunction with one or more other embodiments. Furthermore, the described features, structures, or characteristics may be combined in any suitable manner in one or more embodiments. One skilled in the relevant art will recognize, however, that the invention can be practiced without one or more of the specific details, or with other methods, components, etc. In other instances, well-known structures, or operations are not shown or described in detail to avoid obscuring aspects of the invention.

An important aspect of the encoder design for video compression is control of the granularity of the quantization for each of the color components corresponding to various levels of video quality. Such control is typically achieved by establishing a relationship between the QP associated with a primary color component, typically the luma component, and secondary color components, typically the chroma components.

The range of QP defined in the HEVC standard is limited between −QpBdOffset and 51, inclusively, where QpBdOffset is a quantization parameter range offset derived from a sample bit depth. The quantization parameter range offset QpBdOffset is equal to (6*bit_depth_minus8), where bit_depth_minus8 is equal to the sample bit_depth_minus 8. For input pictures not coded in a monochrome format, a chroma QP (Qpc) for quantization of a chroma TB is derived from a luma QP (Qpy) for quantization of an associated luma TB, and the chroma QP derivation process according to the HEVC standard includes two steps: first, an intermediate QP index (qPi) is determined from a luma QP (Qpy) and a chroma QP offset parameter (chromaQPOffset) by clipping a sum of the luma QP and the chroma QP offset parameter to a specified range, second, a value of the chroma QP (Qpc) is determined through a table look-up operation according to qPi. The specified range is set between −QpBdOffset to 57. This chroma QP derivation process is also described by Equation (1) and Equation (2), and the function Fqpc (qPi) in Equation (2) for 4:2:0 color format is specified in Table 1.

$$qPi = \text{clip3}(-QpBdOffsetC, 57, Qpy + \text{chroma}QpOffset) \quad \text{Equation (1)}$$

$$Qpc = Fqpc(qPi) \quad \text{Equation (2)}$$

where the function clip3(x, y, z) outputs x if z is less than x, output y if z is greater than y, and otherwise output z, QpBdOffsetC is a quantization parameter range offset for corresponding chroma components. The chroma QP offset parameter (chromaQPOffset) may include two syntax elements cb_qp_offset and cr_qp_offset for chroma Cb component and chroma Cr component respectively.

TABLE 1

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| Qpc | =qPi | 29 | 30 | 31 | 32 | 33 | 33 | 34 | 34 | 35 | 35 | 36 | 36 | 37 | 37 | =qPi − 6 |

The function Eqpc (qPi) for coding pictures in 4:2:0 color format is specified in Table 1, however, this function Eqpc (qPi) is an identity function for coding pictures in color formats other than the 4:2:0 color format. The value of the chroma QP is equal to the output of the function Eqpc (qPi) according to the HEVC standard. The chroma QP offset parameter (chromaQpOffset) may be signaled in the Picture Parameter Set (PPS), slice header, and each coding unit for chroma Cb and chroma Cr components, respectively. For Qpc values in the range of 0 to 29, a linear relationship between Qpc and qPi is followed, i.e. Qpc=qPi, whereas a non-linear relationship is followed for Qpc values in the range of 30 to 43, and another linear relationship, i.e. Qpc=qPi−6, between Qpc and qPi is followed for even higher Qpc values. The chroma QP value saturates at a maximum value of 51 when the luma QP value is greater than or equal to 57.

More Adaptive Chroma QP with a Chroma QP Bias The video encoder controls quality trade-off between the luma component and the associated chroma components by altering a difference between the luma QP and chroma QP (Qpy-Qpc) for each TU, however, this difference can only be controlled by adjusting the chroma quantization offset parameter chromaQpOffset in the HEVC standard and JEM. Some new methods introduced in this disclosure support adaptation of the chroma QP more flexibly to improve compression efficiency. In the following embodiments, a chroma QP bias, indicated by chromaQPBias, is used to calculate the chroma QP. A video coding system may adjust the difference between the luma QP and chroma QP by controlling the value of the chroma QP bias. In one embodiment, the chroma QP bias is derived by an intermediate QP index (qPi) according to Equation (3). The resulting chroma QP is set equal to a difference between the intermediate QP index and the chroma QP bias, i.e., Qpc=qPi−chromaQpBias.

$$\text{chroma}QpBias = (qPi < t1)?qpBs1:((qPi > t2)?qpBs2: (s1 * F_{qpBs}(qPi)/s2)) \quad \text{Equation (3)}$$

where qPi may be derived from an associated Qpy, for example, qPi is derived by Equation (1), s1, s2, t1, t2, qpBs1, and qpBs2 are the integral mapping parameters, each of the parameters is either implicitly pre-defined or explicitly derived from information signaled in the video bitstream, and $F_{qpBs}(qPi)$ is a specified function for deriving the chroma QP bias.

According to one example, the specified function $F_{qp}Bs$ (qPi) follows the relationship as shown in Table 2 for coding pictures in 4:2:0 color format. According to another example, the specified function $F_{qpB}s(qPi)$ is a linear function, such as the linear function shown in Equation (4).

TABLE 2

| qPi | <30 | 30 | 31 | 32 | 33 | 34 | 35 | 36 | 37 | 38 | 39 | 40 | 41 | 42 | 43 | >43 |
|---|---|---|---|---|---|---|---|---|---|---|---|---|---|---|---|---|
| $F_{qpBs}(qPi)$ | 0 | 1 | 1 | 1 | 1 | 1 | 2 | 2 | 3 | 3 | 4 | 4 | 5 | 5 | 6 | 6 |

$$F_{qp}Bs(qPi) = qPi - c \qquad \text{Equation (4)}$$

where c is an integral parameter that is either implicitly pre-defined or explicitly derived from information signaled in the video bitstream.

In one example, a video encoder or video decoder sets values of a parameter set (s1, s2, t1, t2, qpBs1, qpBs2, c) for Equation (3) equal to (1, 6, 30, 59, 0, 6, 24) for coding pictures in 4:2:0 color format, and the chroma QP bias is derived by Equation (5). The value of the chroma QP bias in this example is in between 0 and 6, and there is a linear relationship between the chroma QP bias and the intermediate QP index when the value of the intermediate QP index is within 30 and 59.

$$\text{chroma}QpBias=(qPi<30)?0:((qPi>59)?6:((qPi-24)/6)) \qquad \text{Equation (5)}$$

In another example, a video encoder or video decoder sets values of the parameter set (s1, s2, t1, t2, qpBs1, qpBs2, c) for Equation (3) equal to (2, 6, 27, 41, 0, 6, 24) for coding pictures in 4:2:0 color format, so the chroma QP bias is derived by Equation (6). In this example, the chroma QP bias is clipped to the maximum value, which is 6, when the intermediate QP index is greater than 41. A higher chroma QP bias value is output by Equation (6) in comparison to the output of Equation (5) when the value of the intermediate QP index is within 27 and 59.

$$\text{chroma}QpBias=(qPi<27)?0:((qPi>41)?6:((qPi-24)/3)) \qquad \text{Equation (6)}$$

The chroma QP bias derived by this method is linearly increased with an increase in the intermediate QP index when the intermediate QP index is within a certain range, that is the video encoder or video decoder derives the chroma QP from the associated luma QP using a simple calculation instead of using the look-up table as adopted in the HEVC standard and JEM. One or more of the parameters in the parameter set may be signaled in the video bitstream, these parameters may be signaled in a high-level syntax set such as the Sequence Parameter Set (SPS), Picture Parameter Set (PPS), and slice header.

Some embodiments of the chroma QP bias reuses the existing parameters and the specified function Fqpc (qPi) in the HEVC standard, where the chroma QP bias may be derived from a difference between an input and an output of the specified function Fqpc (qPi), i.e. qPi−Fqpc (qPi). The chroma QP bias may be derived from a difference between an associated luma QP and the output of the specified function Fqpc (qPi) according to another embodiment. The output of the specified function Fqpc (qPi) was originally used as the final chroma QP (Q'pc) according to the HEVC standard, but the output of the specified function Fqpc (qPi) may be used for further adjusting the final chroma QP according to some embodiments of the present invention.

Some embodiments of the video encoder and decoder derive one chroma QP bias for the chroma Cb component and one chroma QP bias for the chroma Cr component when the video data having chroma Cb and chroma Cr components. Information for deriving the chroma QP biases may be signaled in one or more of a PPS, slice header, and each coding unit for the chroma Cb and chroma Cr components. For example, a chroma QP offset parameter is signaled in the video bitstream and is used to calculate the intermediate QP index for deriving the chroma QP bias. When the chroma QP offset parameter is represented by two syntax elements cb_qp_offset and cr_qp_offset for the chroma Cb component and chroma Cr component respectively, each of the chroma QP biases for the chroma Cb component and the chroma Cr component is derived according to its corresponding syntax element of the chroma QP offset parameter. For example, the chroma QP bias for the chroma Cb component is derived by a difference between an input and an output of Fqpc (qPi), where this intermediate QP index qPi is derived according to the associated luma QP and the syntax element cb_qp_offset; and the chroma QP bias for the chroma Cr component is derived by a difference between an input and an output of Fqpc (qPi), where qPi is derived according to the associated luma QP and the syntax element cr_qp_offset.

Set a Maximum Chroma QP Bias In some embodiments, a maximum chroma QP bias value relative to the associated luma QP is further limited. In the following embodiments, the initial chroma QP bias is computed by a difference between an intermediate QP index and a specified function Fqpc (qPi), however, the initial chroma QP bias may be computed by Equation (3) or other methods. The final chroma QP bias in one embodiment is derived by a clipping operation as shown in Equation (7). A difference between the intermediate QP index and a specified function Fqpc (qPi) is first calculated (i.e. qPi−Fqpc (qPi)) as the initial chroma QP bias. According to the clipping operation in Equation (7), the final chroma QP bias is equal to a minimum chroma QP bias value (minChromaQpBias) if the initial chroma QP bias is less than the minimum chroma QP bias value, and the final chroma QP bias is equal to a maximum chroma QP bias value (maxChromaQpBias) if the initial chroma QP bias is greater than the maximum chroma QP bias value. The final chroma QP bias is equal to the initial chroma QP bias which is the difference between the intermediate QP index and the specified function if this difference is within the range restricted by the minimum and maximum chroma QP bias values. An example of the specified function Fqpc (qPi) is the mapping function used to derived the chroma QP in Equation (2), and Table 1 shows an example of the mapping relationship between the input qPi and the output Fqpc (qPi).

$$\text{chroma}QpBias=\text{clip3}(\text{minChroma}QpBias, \text{maxChroma}QpBias, qPi-Fqpc(qPi)) \qquad \text{Equation (7)}$$

Although both the maximum chroma QP bias value (maxChromaQpBias) and the minimum chroma QP bias (minChromaQpBias) value are present in Equation (7), it is possible to modify this equation to only have the maximum chroma QP bias value or restrict the chroma QP bias to be non-negative so all non-negative chroma QP bias values less than the maximum chroma QP bias value are allowed. In one example, the minimum chroma QP bias value is set to zero and only the maximum chroma QP bias value is adaptively signaled. In one embodiment of only signaling a maximum chroma QP bias value, the chroma QP bias is derived by a minimum of the maximum chroma QP bias value and an initial chroma QP bias (e.g. the difference between intermediate QP index and the specified function qPi−Fqpc (qPi)) as shown in Equation (8).

$$\text{chroma}Qp\text{Bias}=\min(\text{maxChroma}Qp\text{Bias},qPi-Fqpc(qPi)) \quad \text{Equation (8)}$$

A video encoder may signal information for deriving one or both the maximum chroma QP bias value (maxChromaQpBias) and the minimum chroma QP bias value (minChromaQpBias) or the video encoder and decoder infer one or both the values for the maximum and minimum chroma QP bias values. The information for deriving one or both the maximum and minimum chroma QP bias values may be signaled in a high-level syntax set such as the SPS, PPS, and slice header for chroma Cr and chroma Cb components respectively. The information may be further signaled in coding units or in the units of quantization groups for local adaptation, similar to the conventional signaling method for the chroma quantization offset parameter. In one example, maxChromaQpBias and minChromaQpBias are inferred to be equal to 6 and 0, respectively. In another example, minChromaQpBias is always set to zero, and maxChromaQpBias is adaptively derived by the video encoder and signaled in a video bitstream, so a corresponding video decoder derives maxChromaQpBias from information signaled in the video bitstream. The chroma QP is then calculated by subtracting the chroma QP bias derived by Equation (7) or Equation (8) from the intermediate QP index (i.e. Qpc=qPi−chromaQpBias), which can be represented by Equations (9) and (10).

$$Qpc=qPi-\text{clip3}(\text{minChroma}Qp\text{Bias},\text{maxChroma}Qp\text{Bias},qPi-Fqpc(qPi)) \quad \text{Equation (9)}$$

$$Qpc=qPi-\min(\text{maxChroma}Qp\text{Bias},qPi-Fqpc(qPi)) \quad \text{Equation (10)}$$

The chroma QP bias in another embodiment is derived in a similar manner by Equation (11), and the chroma QP is thus derived by Equation (12). The maximum chroma QP bias value and the minimum chroma QP bias value in Equations (11) and (12) are for the difference between the chroma QP and its associated luma QP. The chroma QP is calculated by subtracting the chroma QP bias derived by Equation (8) from the associated luma QP (i.e. Qpc=Qpy−chromaQpBias).

$$\text{chroma}Qp\text{Bias}=\text{clip3}(\text{minChroma}Qp\text{Bias},\text{maxChroma}Qp\text{Bias},Qpy-Fqpc(qPi)) \quad \text{Equation (11)}$$

$$Qpc=Qpy-\text{clip3}(\text{minChroma}Qp\text{Bias},\text{maxChroma}Qp\text{Bias},Qpy-Fqpc(qPi)) \quad \text{Equation (12)}$$

Scaling Chroma QP Bias In some embodiments, the chroma QP bias value relative to the associated luma QP originally derived by Equation (2) may be further adjusted by scaling. The chroma QP bias is calculated by the difference between the intermediate QP index and the specific function Fqpc (qPi) in this embodiment (i.e. qPi−Fqpc(qPi)). In one example, a video encoder may signal a scaling factor, indicated by chromaQpBiasScaling to support further scaling of the chroma QP bias between the input qPi and output of the mapping function Fqpc(qPi) in Equation (2). The chroma QP in this example may be derived by Equation (13).

$$Qpc=qPi-\text{chroma}Qp\text{BiasScaling}*(qPi-Fqpc(qPi)) \quad \text{Equation (13)}$$

In one specific embodiment, the chroma QP is derived by Equation (14) with three integral parameters a, b, and c. These integral parameters may be implicitly pre-defined or explicitly derived from signaled information. For example, the parameter set (a, b, c) is equal to (1, 1, 1), which corresponds to scaling the chroma QP bias value by a factor of 0.5. In another example, the parameter set (a, b, c) is equal to one of (3, 1, 2), (3, 2, 2), and (3, 3, 2), which corresponds to scaling the chroma QP bias value by a factor of 0.75 with different truncation offset values.

$$Qpc=qPi-((a*(qPi-Fqpc(qPi)).+b)>>c) \quad \text{Equation (14)}$$

In another specific embodiment, the chroma QP is derived by Equation (15) with four integral parameters w1, w2, b, and c. Each of these four parameters may be implicitly pre-defined or explicitly derived from signaled information. In one specific example, the parameter w2 is set equal to ((1<<c)−w1).

$$Qpc=(w1*qPi-w2*Fqpc(qPi)+b)>>c \quad \text{Equation (15)}$$

The scaling factor chromaQpBiasScaling in another example is employed to scale the chroma QP bias value calculated as the difference between the chroma QP derived by Equation (2) and the associated luma QP (i.e. qPy−Fqpc (qPi)). The resulting chroma QP is derived by Equation (16) which replaces the intermediate QP index in Equation (11) with the luma QP.

$$Qpc=qPy-\text{chroma}Qp\text{Bias Scaling}*(qPy-Fqpc(qPi)) \quad \text{Equation (16)}$$

The information associated to the scaling factor and scaling parameters may be signaled in a high-level syntax set such as the SPS, PPS, and slice header. It can be further adapted in the coding units or in the units of quantization groups, similar to the current signaling method for the chroma quantization offset parameters.

Combining the Maximum Chroma QP Bias and Scaling Factor The above methods for more flexibly adapting the chroma QP with the chroma QP bias may be combined together, for example, the video encoder sets a maximum difference (maxChromaQpBias) and a scaling factor (chromaQpBiasScaling) for the chroma QP bias. The chroma QP is derived by Equation (17) when the initial chroma QP bias is derived from a difference between the intermediate QP index and the specific function Fqpc (qPi). The initial chroma QP bias is scaled and clipped within a range set between the maximum and minimum chroma QP bias values.

$$Qpc=qPi-\text{clip3}(\text{minChroma}Qp\text{Bias},\text{maxChroma}Qp\text{Bias},\text{chroma}Qp\text{BiasScaling}*(qPi-Fqpc(qPi))) \quad \text{Equation (17)}$$

Figure 3:
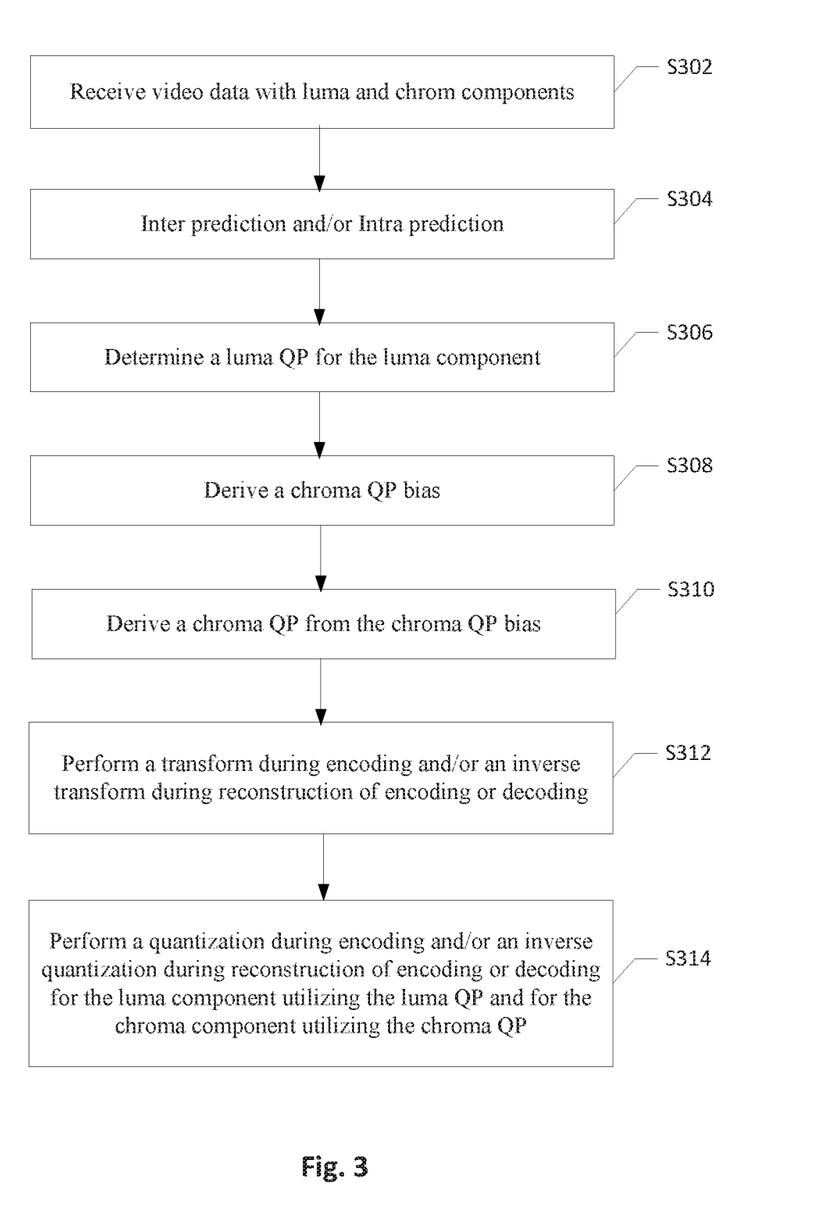
FIG. 3 is a flowchart illustrating an exemplary video encoding or video decoding method according to an embodiment of the present invention.

Exemplary Flow Charts FIG. 3 is a flow chart illustrating an embodiment of a video encoding or decoding method for processing color video data. The video encoding or decoding method may be implemented in a video encoder or video decoder, for example in an apparatus comprising a computer processor configured to receive video data and programming executable on the computer processor for video coding by performing steps shown in FIG. 3. A video encoder receives input video data having a luma component and at least one chroma component or a video decoder receives a video bitstream of encoded video data having a luma component and at least one chroma component in Step S302. The video data are undergo inter prediction and/or intra prediction in Step S304 for reducing temporal and/or spatial redundancies within the received video data. The video encoder determines predictors predicting the input video data, and the video decoder obtains predictors based on information signaled in the video bitstream such as the inter prediction mode and/or intra prediction mode in Step S304. A luma QP is derived for the luma component in Step S306. A chroma QP bias is derived from an intermediate QP index qPi in Step S308, for example the chroma QP bias is derived by a difference between qPi and an intitial chroma QP or the chroma QP bias is derived by a difference between the luma QP and the initial chroma QP, and various other embodiments of deriving the chroma QP bias are illustrated in the disclosure. The initial chroma QP may be calculated by subtracting a specified function from qPi or the luma QP. The video encoder or video decoder derives a chroma QP associated to the luma QP by subtracting the chroma QP bias from the luma QP or by subtracting the chroma QP bias from the intermediate QP index in Step S310. A transform processing is performed during encoding of the received video data and/or an inverse transform processing is performed during reconstruction of encoding or decoding of the received video data in Step S312. The video encoder or video decoder performs a quantization processing during encoding of the received video data and/or performs an inverse quantization processing during reconstruction of encoding or decoding of the received video data for the luma component utilizing the luma QP and for the chroma component utilizing the chroma QP in Step S314.

Figure 4:
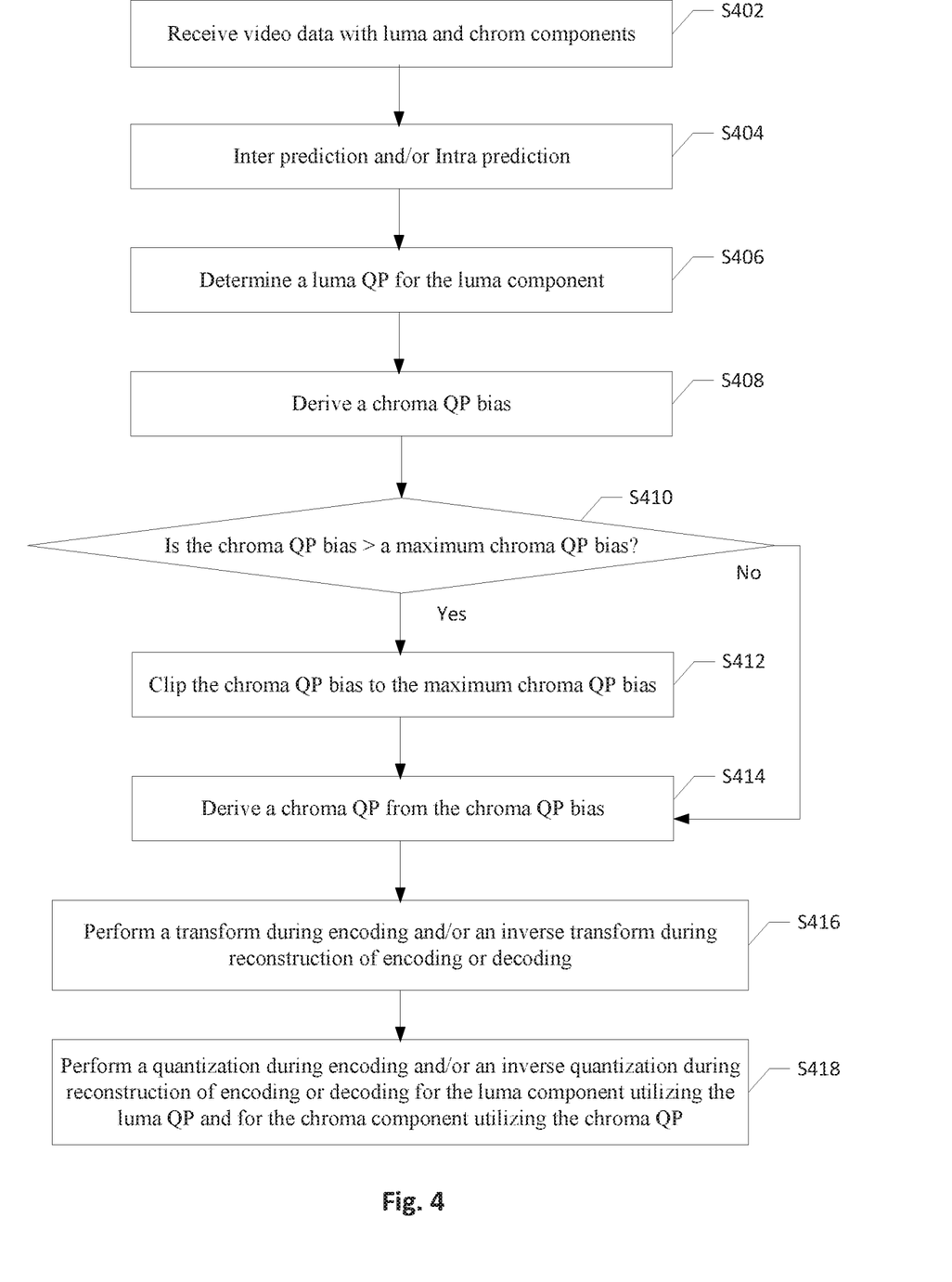
FIG. 4 is a flowchart illustrating an exemplary video encoding or video decoding method according to another embodiment of the present invention.

FIG. 4 is a flow chart illustrating an embodiment of the video encoding or decoding method with the chroma QP bias further restricted by a maximum chroma QP bias value. The video encoder or video decoder implementing the video encoding or decoding method of this embodiment performs Steps S402 to S408 in the same way as Steps S302 to S308 in FIG. 3. In Step S410, the chroma QP bias derived in Step S308 is compared with a maximum chroma QP bias value to check if the chroma QP bias is greater than the maximum chroma QP bias value. The chroma QP bias is clipped to the maximum chroma QP bias value if the initial value of the chroma QP bias is greater than the maximum chroma QP bias value in Step S412; else this chroma QP bias is unchanged. The video encoder or decoder derives a chroma QP based on the chroma QP bias in Step S414, and uses this chroma QP to perform a quantization processing during encoding and/or perform an inverse quantization processing during reconstruction of encoding or decoding for the chroma component in Step S418. A transform processing is performed during encoding and/or an inverse transform processing is performed during reconstruction of encoding or decoding in Step S416. The maximum chroma QP bias value in one embodiment may be adaptively decided by the video encoder according to one or more of the video data content, video format, and resolution, and information associated to the maximum chroma QP bias is signaled to the corresponding video decoder. In another embodiment, the maximum chroma QP bias value may be pre-defined for each video resolution and/or video format, so the video encoder and video decoder select the same maximum chroma QP bias value to clip the chroma QP bias.

Figure 5:
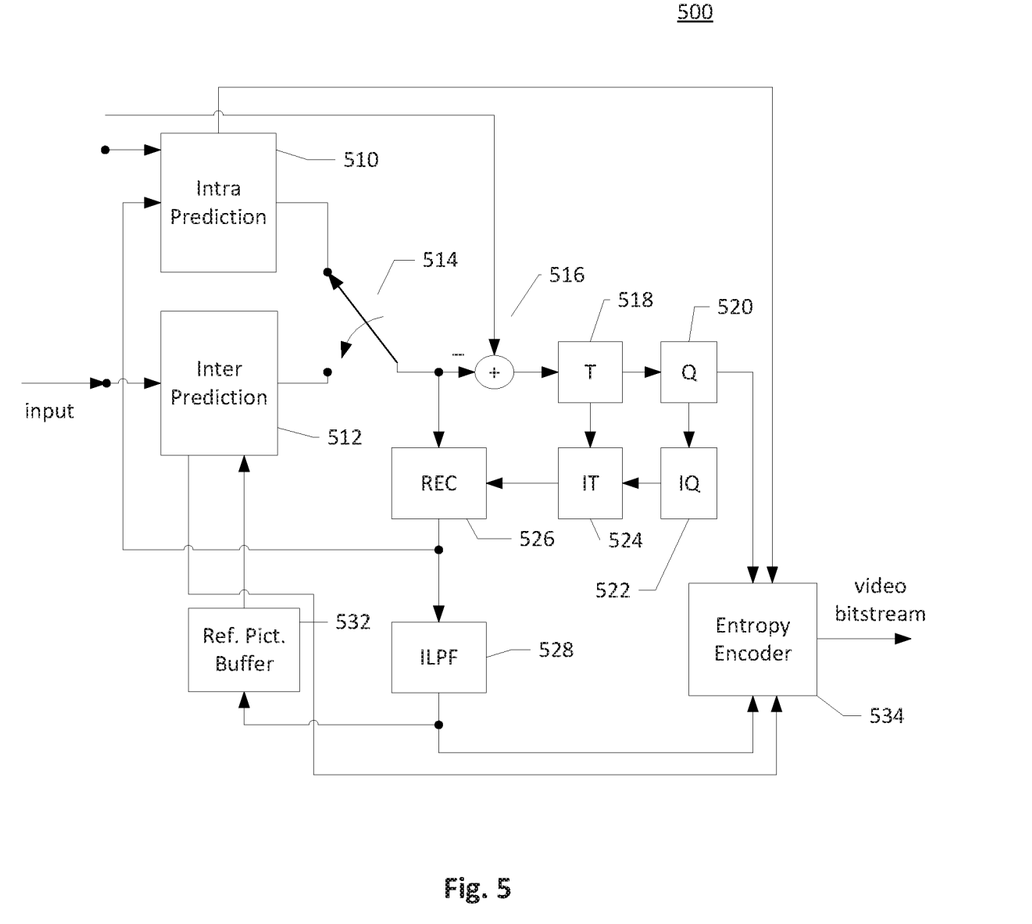
FIG. 5 illustrates an exemplary system block diagram for a video encoding system incorporating the video encoding method according to embodiments of the present invention.

Exemplary System Block Diagrams FIG. 5 illustrates an exemplary system block diagram for a Video Encoder 500 that may implement various embodiments of the present invention. An intra Prediction module 510 provides intra predictors based on reconstructed video data of a current picture. An inter Prediction module 512 performs motion estimation (ME) and motion compensation (MC) to provide predictors based on video data from other picture or pictures. Either the Intra Prediction module 510 or Inter Prediction module 512 supplies the selected predictor to an Adder 516 to form prediction errors, also called residues. The residues of the current block are further processed by a Transform (T) processing 518 followed by a Quantization (Q) processing 520. The transformed and quantized residual signal is then encoded by Entropy Encoder 534 to form a video bitstream. In the Quantization module 520, a luma QP is first determined and used to derive a chroma QP by considering a chroma QP bias. Information for deriving the chroma QP bias may be signaled in the video bitstream, and the chroma QP bias may be restricted by a maximum chroma QP bias value. The chroma QP bias may also be restricted by a minimum chroma QP bias value in one embodiment, and each of the maximum and minimum chroma QP bias values may be explicitly derived from the video bitstream or implicitly inferred. In some embodiments, the chroma QP bias is scaled by a scaling factor or a parameter sets. The video bitstream is then packed with side information including the information for deriving the chroma QP bias such as one or a combination of a chroma QP offset parameter, the maximum chroma QP bias value, the minimum chroma QP bias value, and a scaling factor. The transformed and quantized residual signal of the current block is processed by an Inverse Quantization (IQ) processing 522 and Inverse Transform (IT) processing 524 to recover the prediction residues. As shown in FIG. 5, the residues are recovered by adding back to the selected predictor at Reconstruction (REC) 526 to produce reconstructed video data. The reconstructed video data may be stored in a Reference Picture Buffer (Ref. Pict. Buffer) 532 and used for prediction of other pictures. The reconstructed video data from REC 526 may be subject to various impairments due to the encoding processing, consequently, an In-loop Processing Filter (ILPF) 528 is applied to the reconstructed video data before storing in the Reference Picture Buffer 532 to further enhance picture quality. Syntax elements associated with the chroma QP bias are provided to an Entropy Encoder 534 for incorporation into the video bitstream.

Figure 6:
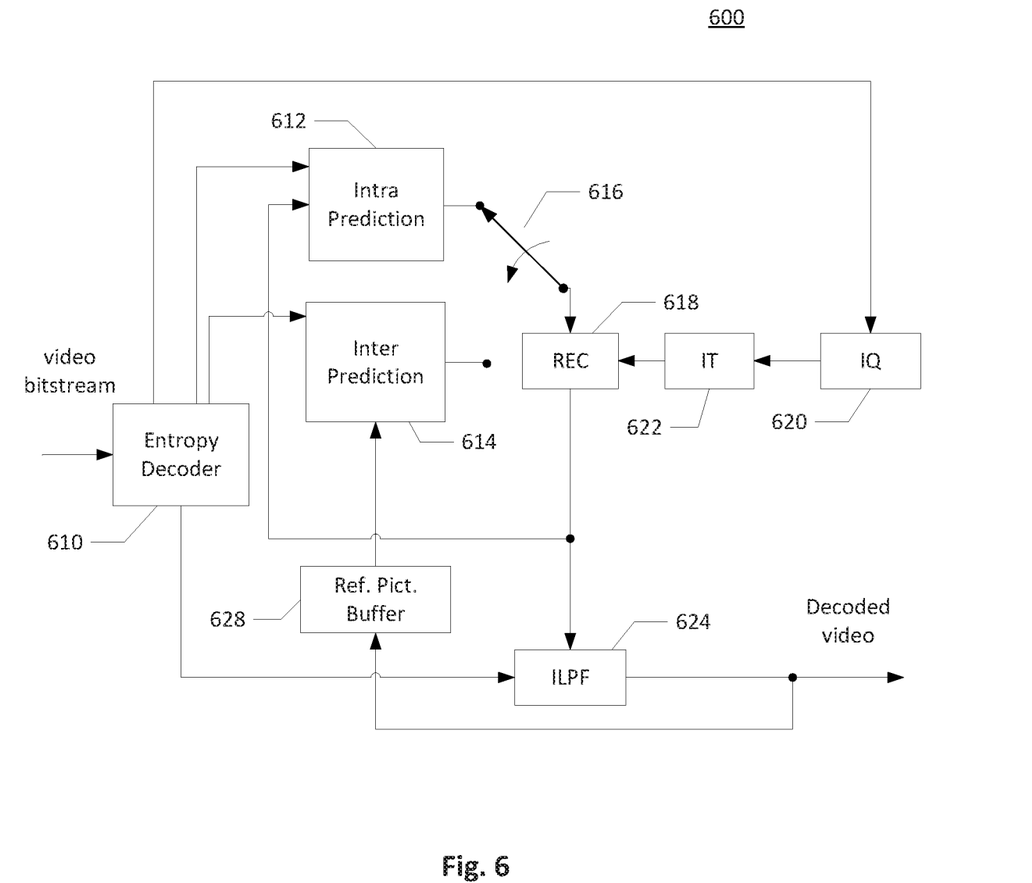
FIG. 6 illustrates an exemplary system block diagram for a video decoding system incorporating the video decoding method according to embodiments of the present invention.

A corresponding Video Decoder 600 for the Video Encoder 500 of FIG. 5 is shown in FIG. 6. The video bitstream containing encoded video data having a luma component and at least one chroma component is the input to the Video Decoder 600 and is decoded by an Entropy Decoder 610 to parse and recover the transformed and quantized residual signal and other system information. The entropy Decoder 610 parses information for deriving a chroma QP bias from the video bitstream. The decoding process of the Decoder 600 is similar to the reconstruction loop at the Encoder 500, except the Decoder 600 only requires motion compensation prediction in Inter Prediction 614. Each block is decoded by either Intra Prediction 612 or Inter Prediction 614. A switch 616 selects an intra predictor from Intra Prediction 612 or an inter predictor from Inter Prediction 614 according to decoded mode information. The transformed and quantized residual signal associated with each block is recovered by an Inverse Quantization (IQ) processing 620 and Inverse Transform (IT) processing 622. The IQ module 620 recovers the quantized residual signal according to a luma QP and a chroma QP, and the chroma QP is derived by subtracting a chroma QP bias from the luma QP or by subtracting a chroma QP bias from an intermediate QP index. The chroma QP bias is derived according to information parsed by the Entropy Decoder 610 according to some embodiments. The recovered residual signal is reconstructed by adding back the predictor in REC 618 to produce reconstructed video. The reconstructed video is further processed by an In-loop Processing Filter (ILPF) 624 to generate final decoded video. If the currently decoded picture is a reference picture, the reconstructed video of the currently decoded picture is also stored in a Ref. Pict. Buffer 628 for later pictures in decoding order.

Various components of the Video Encoder 500 and the Video Decoder 600 in FIG. 5 and FIG. 6 may be implemented by hardware components, one or more computer processors configured to execute program instructions stored in a memory, or a combination of hardware and processor. For example, a processor executes program instructions to control receiving of video data having luma component and two chroma components. The processor is equipped with a single or multiple processing cores. In some examples, the processor executes program instructions to perform functions in some components in the Encoder 500 and the Decoder 600, and the memory electrically coupled with the processor is used to store the program instructions, information corresponding to the reconstructed images of blocks, and/or intermediate data during the encoding or decoding process. The memory in some embodiment includes a non-transitory computer readable medium, such as a semiconductor or solid-state memory, a random access memory (RAM), a read-only memory (ROM), a hard disk, an optical disk, or other suitable storage medium. The memory may also be a combination of two or more of the non-transitory computer readable medium listed above. As shown in FIGS. 5 and 6, the Encoder 500 and the Decoder 600 may be implemented in the same electronic device, so various functional components of the Encoder 500 and the Decoder 600 may be shared or reused if implemented in the same electronic device. For example, one or more of the Reconstruction 526, Inverse Transformation 524, Inverse Quantization 522, In-loop Processing Filter 528, and Reference Picture Buffer 532 in FIG. 5 may also be used to function as the Reconstruction 618, Inverse Transformation 622, Inverse Quantization 620, In-loop Processing Filter 624, and Reference Picture Buffer 628 in FIG. 6, respectively.

Embodiments of the video encoding or decoding method for a video coding system may be implemented in a circuit integrated into a video compression chip or program code integrated into video compression software to perform the processing described above. For examples, determining of a current mode set for the current block may be realized in program code to be executed on a computer processor, a Digital Signal Processor (DSP), a microprocessor, or field programmable gate array (FPGA). These processors can be configured to perform particular tasks according to the invention, by executing machine-readable software code or firmware code that defines the particular methods embodied by the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of encoding or decoding video data in a video coding system, comprising:

receiving the video data having a luminance (luma) component and at least one chrominance (chroma) component;

performing inter prediction and/or intra prediction for reducing temporal and/or spatial redundancies within the received video data;

determining a luma Quantization Parameter (QP) for the luma component;

deriving a chroma QP bias from an intermediate QP index, wherein the intermediate QP index is computed by clipping a sum of the luma QP and a chroma QP offset parameter to a specified range;

calculating a chroma QP by subtracting the chroma QP bias from the luma QP or by subtracting the chroma QP bias from the intermediate QP index;

performing a transform processing during encoding of the received video data and/or performing an inverse transform processing during reconstruction of encoding or decoding of the received video data; and performing a quantization processing during encoding of the received video data and/or performing an inverse quantization processing during reconstruction of encoding or decoding of the received video data for the luma component utilizing the luma QP and for the chroma component utilizing the chroma QP.

2. The method of claim 1, wherein the video data having two chroma components, chroma Cb and chroma Cr, and the method further comprising deriving one chroma QP bias for the chroma Cb component and another chroma QP bias for the chroma Cr component, and information for deriving the two chroma QP biases is signaled in one or a combination of a Picture Parameter Set (PPS), slice header, and each coding unit for the chroma Cb and chroma Cr components.

3. The method of claim 1, wherein the chroma QP bias is derived by a function $F_{gpBs}$ (qPi) and a parameter set, the function $F_{gpBs}$ (qPi) outputs an integral value according to the intermediate QP index, and the integral value is scaled according to the parameter set, wherein each value in the parameter set is implicitly pre-defined or explicitly derived from information signaled in a video bitstream.

4. The method of claim 3, wherein a value of the chroma QP bias is restricted by two QP boundary values (qpBs1, qpBs2) specified in the parameter set, the chroma QP bias is equal to the scaled integral value when the intermediate QP index is within an index range (t1, t2) specified in the parameter set, and the chroma QP bias is equal to one of the QP boundary value when the intermediate QP index is outside the index range specified in the parameter set.

5. The method of claim 1, wherein the chroma QP bias is derived from a difference between the intermediate QP index and the output of a specified function Fqpc (qPi) or a difference between the luma QP and the output of the specified function Fqpc (qPi), wherein the chroma QP is derived by subtracting the chroma QP bias from the luma QP when the chroma QP bias is derived from the difference between the luma QP and the output of the specified function Fqpc (qPi), and the chroma QP is derived by subtracting the chroma QP bias from the intermediate QP index when the chroma QP bias is derived from the difference between the intermediate QP index and the output of the specified function Fqpc (qPi).

6. The method of claim 5, wherein the specified function Fqpc (qPi) outputs a value by searching a mapping table according to the intermediate QP index.

7. The method of claim 1, further comprising determining if the chroma QP bias is greater than a maximum chroma QP bias value, and clipping the chroma QP bias to the maximum chroma QP bias value if the chroma QP bias is greater than the maximum chroma QP bias value.

8. The method of claim 7, wherein the maximum chroma QP bias value is explicitly signaled in a high-level syntax set.

9. The method of claim 8, wherein the maximum chroma QP bias value is further signaled in coding units or in units of quantization groups.

10. The method of claim 7, further comprising determining if the chroma QP bias is smaller than a minimum chroma QP bias value, and clipping the chroma QP bias to the minimum chroma QP bias value if the chroma QP bias is smaller than the minimum chroma QP bias value.

11. The method of claim 10, wherein the minimum chroma QP bias value is explicitly signaled or implicitly inferred.

12. The method of claim 10, wherein the minimum chroma QP bias value is set to zero and the maximum chroma QP bias value is adaptively derived.

13. The method of claim 12, wherein the maximum chroma QP bias value is signaled in a video bitstream when the video coding system is an encoder, and the maximum chroma QP bias is derived from information signaled in a video bitstream when the video coding system is a decoder.

14. The method of claim 1, wherein deriving the chroma QP further comprises determining a minimum value between a maximum chroma QP bias value and the chroma QP bias, and subtracting the minimum value between the maximum chroma QP bias value and the chroma QP bias from the luma QP or intermediate QP index.

15. The method of claim 1, further comprising scaling the chroma QP bias and the chroma QP is derived by subtracting the scaled chroma QP bias from the luma QP or from the intermediate QP index.

16. The method of claim 15, wherein a scaling factor or a parameter set of integral parameters is signaled in a video bitstream for scaling the chroma QP bias.

17. An apparatus for performing video coding, comprising: a computer processor configured for receiving video data; and programming executable on the computer processor for video coding by performing steps comprising:
  receiving the video data having a luminance (luma) component and at least one chrominance (chroma) component;
  performing inter prediction and/or intra prediction for reducing temporal and/or spatial redundancies within the received video data;
  determining a luma Quantization Parameter (QP) for the luma component;
  deriving a chroma QP bias from an intermediate QP index, wherein the intermediate QP index is computed by clipping a sum of the luma QP and a chroma QP offset parameter to a specified range;
  calculating a chroma QP by subtracting the chroma QP bias from the luma QP or by subtracting the chroma QP bias from the intermediate QP index;
  performing a transform processing during encoding of the received video data and/or performing an inverse transform processing during reconstruction of encoding or decoding of the received video data; and
  performing a quantization processing during encoding of the received video data and/or performing an inverse quantization processing during reconstruction of encoding or decoding of the received video data for the luma component utilizing the luma QP and for the chroma component utilizing the chroma QP.

18. A non-transitory computer readable medium storing program instruction causing a processing circuit of an apparatus to perform video coding method, and the method comprising:
  receiving the video data having a luminance (luma) component and at least one chrominance (chroma) component;
  performing inter prediction and/or intra prediction for reducing temporal and/or spatial redundancies within the received video data;
  determining a luma Quantization Parameter (QP) for the luma component;
  deriving a chroma QP bias from an intermediate QP index, wherein the intermediate QP index is computed by clipping a sum of the luma QP and a chroma QP offset parameter to a specified range;
  calculating a chroma QP by subtracting the chroma QP bias from the luma QP or by subtracting the chroma QP bias from the intermediate QP index;
  performing a transform processing during encoding of the received video data and/or performing an inverse transform processing during reconstruction of encoding or decoding of the received video data; and
  performing a quantization processing during encoding of the received video data and/or performing an inverse quantization processing during reconstruction of encoding or decoding of the received video data for the luma component utilizing the luma QP and for the chroma component utilizing the chroma QP.

* * * * *